United States Patent [11] 3,620,367

[72] Inventor Oren G. Stembel
 3132 N. Nathchez, Chicago, Ill. 60634
[21] Appl. No. 889,044
[22] Filed Dec. 30, 1969
[45] Patented Nov. 16, 1971
 Continuation-in-part of application Ser. No. 737,109, June 14, 1968, now abandoned. This application Dec. 30, 1969, Ser. No. 889,044

[54] CASSETTE STORAGE CONTAINER
 12 Claims, 13 Drawing Figs.
[52] U.S. Cl. ................................................ 206/65 R,
 206/1, 220/20, 229/2.5
[51] Int. Cl. ............................................. B65d 1/34,
 B65d 85/67
[50] Field of Search ........................................ 206/52 R,
 52 F, 72, 79, 65 R, DIG. 32, 1; 220/31 S, 20; 229/2.5

[56] References Cited
 UNITED STATES PATENTS
 521,102 6/1894 Crocker ................. 206/DIG. 32
 2,720,969 10/1955 Kendall ................. 206/72 UX
 2,883,061 4/1959 Moore ................... 206/79
 2,941,663 6/1960 Ettlinger, Jr. ........... 206/72
 3,272,325 9/1966 Schoenmakers .......... 206/52 F
 3,305,084 2/1967 Higgins et al. .......... 206/63.2 R
 3,367,483 2/1968 Studen ................. 206/65 R Primary Examiner—William T. Dixson, Jr.
Attorney—Rummler and Snow ABSTRACT: A cassette storage container having short protruding opposed detents extending interiorly in the container for cooperative engagement with opposed outwardly extending elongated protrusions or flanges on cassette end walls to lock the cassette in the container to prevent accidental displacement thereof. Also, the distance between the side and end walls of the container may be slightly smaller than the area between the side and end walls of the cassette whereby the cassette may be held frictionally therein. A fulcrum is provided in the bottom wall of the container on which the cassette seats and about which the cassette is moved when pressure is applied to the top end surface of the cassette, or such fulcra may be positioned integrally on the bottom wall of the cassette to obtain the same action.

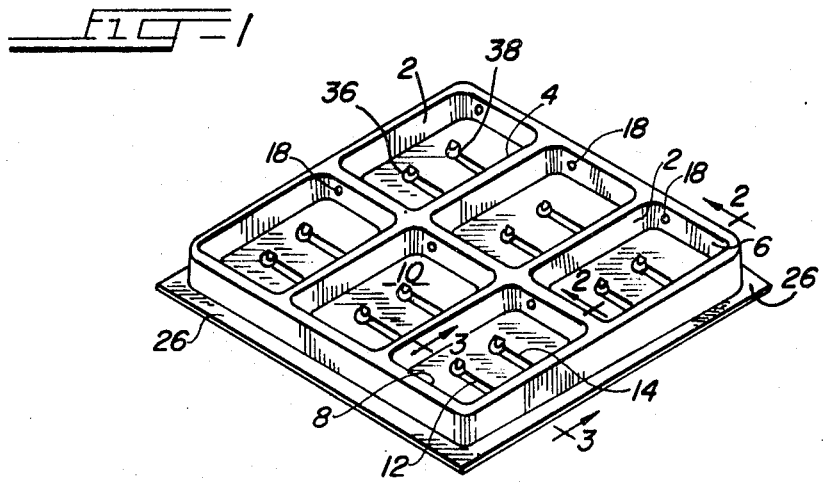
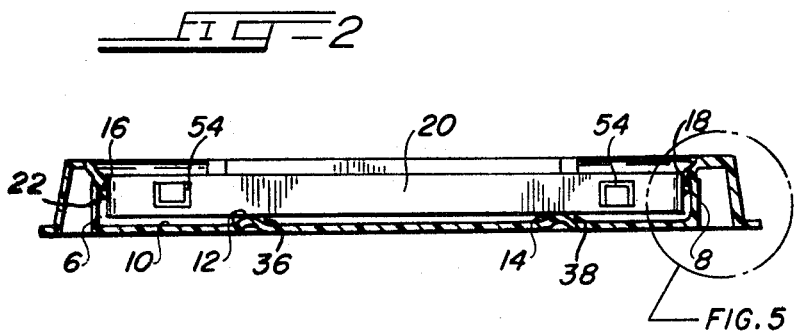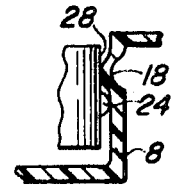
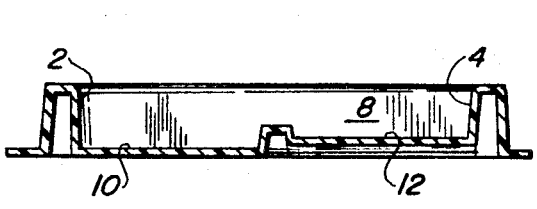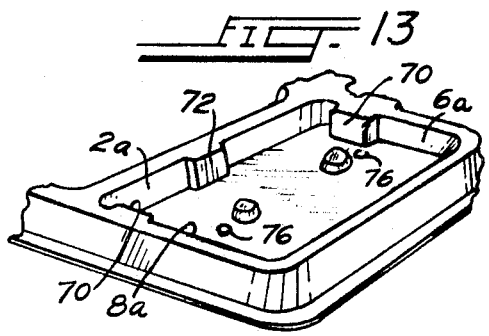
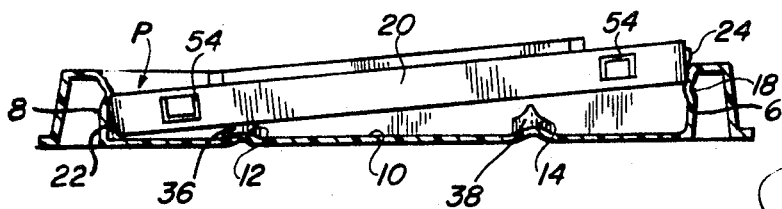
INVENTOR
OREN G. STEMBEL
BY Rummler & Snow
ATTYS

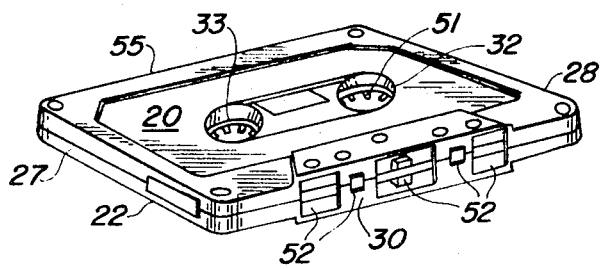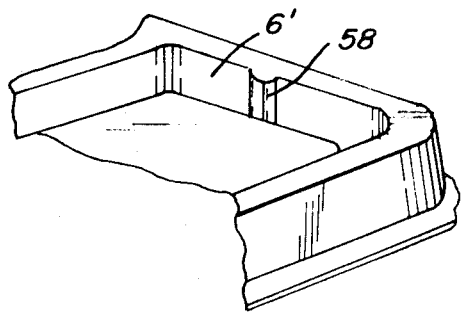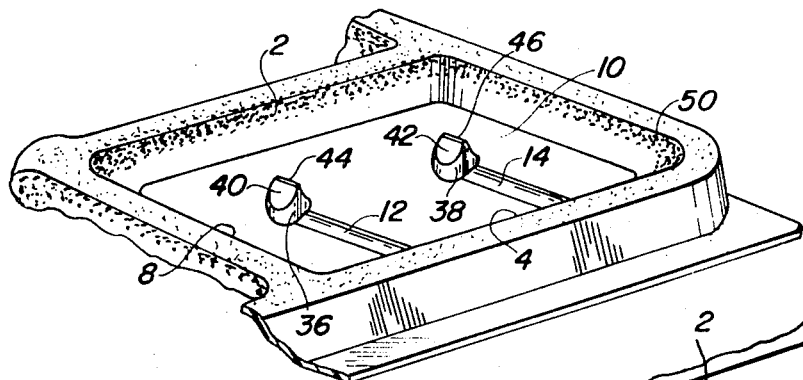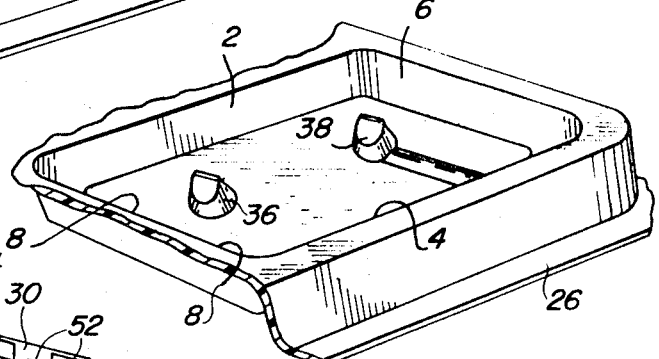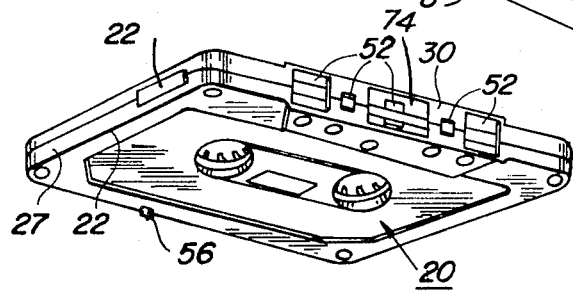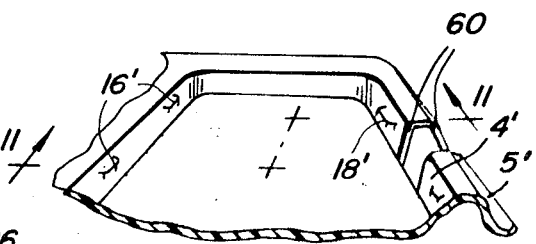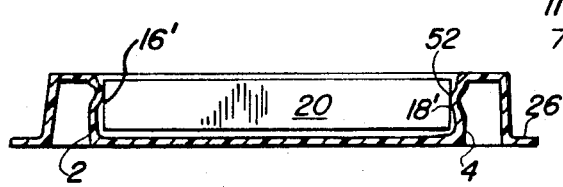

3,620,367

CASSETTE STORAGE CONTAINER

This application is a continuation-in-part of my application Ser. No. 737,109, filed June 14, 1968 now abandoned.

SUMMARY OF THE INVENTION

The main object of this invention is to provide a container for cassettes in which the cassette will be held against accidental displacement and wherein the combination includes means in the container for latching the cassette gears, and fulcra means for deliberate displacement of the cassette when desired.

Another object of this invention is to provide a cassette container having means in the container sidewalls and on the cassette end walls to cooperatively retain a cassette in the container and prevent accidental displacement thereof. Further, to provide a fulcrum either on the cassette proper or in the bottom of the container about which the cassette moves when pressure is applied to the top outer end of the cassette whereby the opposite end of the cassette will be raised out of the container. Further, to provide a container having an integrally formed post to lock the teeth of the gears of a cassette when positioned in the container.

BRIEF DESCRIPTION OF THE DRAWINGS

FIG. 1 is a perspective view of a multiple container of my invention.

FIG. 2 is a cross-sectional view taken on the line 2—2 of FIG. 1, but illustrates the cassette in position therein in full lines.

FIG. 3 is a cross-sectional view taken on the line 3—3 of FIG. 1.

FIG. 4 is a cross-sectional view illustrating the cassette in position to be removed from the container and moved about a fulcra.

FIG. 5 is a greatly enlarged view of the area shown within the broken-lined circle in FIG. 2 but illustrating a detent locking the cassette in the container.

FIG. 6 is a perspective view of the cassette.

FIG. 7 is a perspective view of a modified form of a container.

FIG. 8 is a perspective view of another form of a container.

FIG. 9 is a partial perspective view of the bottom wall of a modified form of cassette.

FIG. 10 is a partial cross-sectional view of another modification showing detents positioned on the sidewalls.

FIG. 11 is a cross-sectional view taken on the lines 11—11 of FIG. 10.

FIGS. 12 and 13 are perspective views of two other modifications, with parts broken away.

DETAILED DESCRIPTION OF THE INVENTION

The cassette storage container according to this invention is preferably constructed of thin lightweight semiflexible plastic and molded into form.

In FIG. 1, I have shown a container having six compartments and since each is identical in form and construction, only one will be described in detail.

Each compartment is provided with sidewalls 2, 4 and end walls 6, 8, respectively, are slightly tapered upwardly from the bottom wall 10.

A pair of spaced elongated pivot or fulcrum supports or bars 12, 14 of semicylindrical form are integrally formed or molded in the bottom wall 10. As shown in FIGS. 1 and 3, these members 12, 14 extend inwardly toward wall 2 from the sidewall 4 substantially medially of the long axis of the container. A pair of opposed detents or protrusions 16, 18 are provided in the end walls 6 and 8, respectively, adjacent to the upper edges thereof and each extends inwardly into the interior of the container.

The cassette 20 is of the usual and customary design readily found on the open market and is provided with identical flanges 22 and 24 extending outwardly on the opposed end walls 27, 28, respectively, and adjacent to the ends of the sidewall or face 30 as shown in FIG. 6.

The relationship of the detents 16, 18 and the flanges 22, 23 is critical in that the distance the detents extend inwardly into the compartment must be substantially the same as the width of the flanges whereby the cassette may be snapped into the container with the flanges positioned below the detents 16, 18 as shown in FIG. 5. The flanges are readily forced over the detents as the detents and flanges are each slightly rounded at their edges.

As will be seen in the preferred embodiment drawings, the cassette is of a height less than the depth of the container (see FIG. 5). Also, the width and length of the cassette plus the width of the flanges 22, 24 is likewise substantially equal to or slightly less than the width and length of the container.

All cassettes are provided with the usual pair of nylon gears 32, 33 which wind and rewind the tape therein, and both are loosely positioned and retained therein.

The walls of the container are preferably inverted U-shape cross section for stability, as illustrated in the drawings (see FIGS. 2 and 3, for instance).

To best illustrate the operation of the invention, FIG. 2 shows the cassette positioned in the container resting on the supports 12, 14. As should be obvious, and as especially shown in FIG. 5, it is almost impossible to accidentally displace the cassette.

As shown in FIG. 4, pressure, for instance, by a finger, is applied to the left-hand side of the top of the cassette as indicated by the letter "P" and the arrow. The cassette at this point shifts to the bottom wall 10 about the fulcrum 12, thereby causing the right-hand end (as illustrated in this figure) of the cassette to move upwardly, with the flange 22 snapping over the detent 18. Now the cassette may be readily withdrawn from the container.

The cassette is replaced in the container by pressuring both the flanges 22, 24 simultaneously over the detents.

It should now be obvious from the foregoing disclosure that a single fulcrum (see FIG. 8) may be provided on the bottom wall 10 medially of the end walls 6, 8 since the cassette will readily pivot thereabout for release of the cassette from the container, in the same manner as described heretofore. Also, the protrusions or detents 16, 18 may be any kind of a projection into the interior of the container as long as they project inwardly in the same proportion as expressed in the principal embodiment described above. For instance, in the modification of FIG. 8, the area between the end and sidewalls may be slightly smaller than the length and width of the cassette so that the cassette may be frictionally held in the container instead of employing detents. In the modification of FIG. 7, the container walls 2, 4, 6 and 8 are roughened as at 50 and the distance between the end and sidewalls may be only slightly smaller than the length and width of the cassette whereby the cassette will also be held in the container frictionally.

The posts 36, 38 of all containers illustrated are accurately positioned and are integrally anchored or molded in or to the bottom wall 10 in alignment with the axis of respective gears 32, 33 of the cassette. The upper ends of the posts 36, 38 are tapered as at 40, 42 to come to the blunt edges 44, 46. Thus, when the cassette is positioned in the container properly, no matter where the spaces between the teeth 51 of the gears 32, 33 are located, the blunt ends 44, 46 will cause them to shift so that the upper end of the tapered walls 40, 42 will be positioned between two individual teeth and prevent rotation of the gears 32, 33, and prevent accidental shifting of the tape on the gear.

Also, because of the position of the posts 36, 38, the face 30 of the cassette will be positioned correctly in the container adjacent the sidewall 4 to insure latching engagement of the cassette in the container.

Because of the normal openings 52 and 54 in the face 30 and rear wall 55 of the cassette (see FIG. 6), it should be obvious that appropriate latching of the cassette may be insured because the detents or protrusions 16', 18', may be appropriately placed on the sidewalls 2, 4 (see FIG. 11) to cooperate with any of the openings 52, 54.

As shown in FIG. 9, the cassette itself may be formed with a protrusion 56 on the bottom wall 58 which may act as a fulcrum to release the cassette from a container not having the fulcra 12-14 on the bottom wall thereof.

As best shown in FIG. 12, the end walls 6, and 8, are provided with vertically extending and inwardly protruding bosses or protrusions 58 of a thickness slightly larger than the width of the flanges 22 on the cassette and offset therefrom when the cassette is in the container to hold the container frictionally to prevent accidental displacement thereof. These protrusions are normally molded in the sidewall.

Also, as shown in FIG. 10, the sidewalls 4' and 5' may be cut out as at 60 whereby, by using the fingers, the cassette may be removed from the container against the holding action of the detents and/or frictional retention.

In the modification shown in FIG. 13, the friction retaining means is a pair of opposed protrusions 70 extending inwardly toward each other and positioned on the end walls 6a and 8a whereby when the cassette 20 is placed therein, the flanges 22-24 will lie thereagainst. A third protrusion 72 is positioned on the sidewall 2a medially between the end walls 6a and 8a whereby the head 74 of the cassette will lie thereagainst.

The support means 76 is a pair of raised portions about which the cassette pivots when pressure is applied adjacent one end of the top wall, the same way as shown in FIG. 4.

It is to be understood that the details shown may be altered or omitted without departing from the spirit of this invention as defined by the following claims.

I claim:

1. The combination with a cassette having an outwardly extending flange on each of the end walls thereof substantially medially of the top and bottom edges thereof and having a pair of spaced wind and rewind gears, a container having end and sidewalls and a bottom wall, said bottom wall having a support means, a pair of short upstanding posts each in axial alignment with said cassette gears when said cassette is positioned in said container, each of said posts having a means for seating between adjacent pairs of gear teeth, a pair of opposed detents one on each of the end walls adjacent the upper edge of said sidewall and extending inwardly into the container and overlying said flanges on said cassette when said cassette is positioned in said container, whereby when pressure is applied to the top wall of the cassette adjacent one end the cassette will fulcrum about said support means and release said cassette from said detent.

2. The device according to claim 1 wherein plural support means are provided in said bottom wall.

3. The combination with a cassette having an outwardly extending flange on each of the end walls thereof substantially medially of the top and bottom edges thereof and having a pair of spaced wind and rewind gears, a plurality of containers for said cassettes, each container having end and sidewalls and a bottom wall, said bottom wall having a support means, a pair of short upstanding posts each in axial alignment with said cassette gears when said cassette is positioned in said container, each of said posts having a means for seating between adjacent pairs of gear teeth, a pair of opposed detents one on each of the end walls adjacent the upper edge of said sidewall and extending inwardly into the container and overlying said flanges on said cassette when said cassette is positioned in said container, whereby when pressure is applied to the top wall of the cassette adjacent one end of the cassette will fulcrum about said support means and release said cassette from said detent.

4. A container according to claim 3 wherein the support means is a pair of spaced semicylindrical bars.

5. The combination with a cassette having spaced wind and rewind gears therein, a container having end and sidewalls and a bottom wall, means on said bottom wall extending upwardly in axial alignment with said gears when said cassette is positioned in said container, and for engagement with said gears, the area between the end and sidewalls of said container being slightly smaller than the length and width of the cassette whereby said cassette is frictionally held in said container to prevent accidental displacement and fulcrum means on the bottom wall of said container for removing said cassette from said container.

6. A cassette having a pair of side and end walls and a bottom and top wall, a raised portion on said bottom wall extending downwardly therefrom to act as a fulcrum point, and a pair of spaced gears therein, in combination with a container having a pair of side and end walls, and a bottom wall, and friction means on one of said container walls to retain said cassette therein to prevent accidental displacement thereof and a pair of upstanding posts on said bottom wall adapted to coact with said gears when said cassette is in the container to prevent rotation thereof.

7. The device according to claim 6 wherein one of the container walls is cut away to expose a portion of the cassette exteriorly of the container to form an opening therein to remove the cassette from the container.

8. The combination of a cassette having a pair of end and sidewalls and a top and bottom wall, a flange on each of said end walls extending outwardly therefrom and positioned adjacent one end thereof, and a pair of spaced gears therein; a container for said cassette having a pair of side and end walls and a bottom wall, a pair of spaced posts formed integrally in said bottom wall and extending upwardly each in axial alignment with said cassette gears when said cassette is housed in said container, a support means on said bottom wall to elevate the major portion of the bottom wall of said cassette above the surface of said bottom wall of said cassette when housed in said container, a pair of opposed vertically extending protrusions, one on each of said container end walls and extending inwardly therefrom, the distance between the protrusions being less than the overall length of the cassette, to frictionally retain said cassette in said container, whereby when downward pressure is exerted on said top wall of said cassette adjacent one end, the cassette will fulcrum about said support means to release said cassette from said container.

9. The container according to claim 8 wherein the protrusions on said end walls are adjacent one of the sidewalls, and the distance between the protrusions is less than the overall length of the cassette including the flanges thereon.

10. The device according to claim 8 wherein an additional protrusion is incorporated on one of the sidewalls which will lie against the head of the cassette when positioned in said container.

11. A tray having plural compartments for housing a plurality of cassettes, each compartment comprising end and sidewalls and a bottom wall, holding means on a pair of said walls to secure a cassette in said compartment, support means on the bottom wall for forming a fulcrum point, said holding means engaging a portion of the interior structure of the cassette housed in said compartment.

12. A container according to claim 11 wherein the holding means are detents.

* * * * *